US012327569B2

(12) United States Patent
Pihlajakuja et al.

(10) Patent No.: US 12,327,569 B2
(45) Date of Patent: Jun. 10, 2025

(54) SPATIAL PARAMETER SIGNALLING

(71) Applicant: NOKIA TECHNOLOGIES OY, Espoo (FI)

(72) Inventors: Tapani Pihlajakuja, Vantaa (FI); Mikko-Ville Laitinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 564 days.

(21) Appl. No.: 17/270,354

(22) PCT Filed: Aug. 8, 2019

(86) PCT No.: PCT/FI2019/050581
§ 371 (c)(1),
(2) Date: Feb. 22, 2021

(87) PCT Pub. No.: WO2020/043935
PCT Pub. Date: Mar. 5, 2020

(65) Prior Publication Data

US 2021/0319799 A1 Oct. 14, 2021

(30) Foreign Application Priority Data

Aug. 31, 2018 (GB) ..................................... 1814227

(51) Int. Cl.
*G10L 19/02* (2013.01)
*G10L 19/008* (2013.01)

(52) U.S. Cl.
CPC ........ *G10L 19/0204* (2013.01); *G10L 19/008* (2013.01)

(58) Field of Classification Search
CPC ..... G10L 19/008; G10L 19/167; G10L 19/20; H04S 2400/01
See application file for complete search history.

(56) References Cited

U.S. PATENT DOCUMENTS 8,069,052 B2 * 11/2011 Thumpudi ............ G10L 19/008 704/503
9,241,216 B2 1/2016 Keiler et al.
(Continued)

FOREIGN PATENT DOCUMENTS

CN 1926610 A 3/2007
CN 1932877 A 3/2007
(Continued)

OTHER PUBLICATIONS

Extended European Search Report for European Application No. 19855639.1 dated May 3, 2022, 9 pages.
(Continued)

*Primary Examiner* — Mark Villena
(74) *Attorney, Agent, or Firm* — ALSTON & BIRD LLP

(57) ABSTRACT

An apparatus comprising means for: obtaining at least one audio signal; obtaining at least one parameter respectively for each of at least two frequency bands associated with the at least one audio signal; and selecting a frequency band of the at least two frequency bands based on comparing at least one further respective parameter for each of the at least two frequency bands wherein the at least one further respective parameter is determined from each of the at least two frequency bands; generating an output comprising a selection of the at least one parameter associated with the selected frequency band of the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands.

20 Claims, 9 Drawing Sheets

(56) References Cited

U.S. PATENT DOCUMENTS

| | | | | |
|---|---|---|---|---|
| 9,756,448 | B2 * | 9/2017 | Purnhagen | H04S 3/008 |
| 2005/0053242 | A1 | 3/2005 | Henn et al. | |
| 2006/0233380 | A1 * | 10/2006 | Holzer | G10L 19/008 381/23 |
| 2006/0235679 | A1 | 10/2006 | Sperschneider et al. | |
| 2007/0208565 | A1 | 9/2007 | Lakaniemi et al. | |
| 2007/0297519 | A1 | 12/2007 | Thompson et al. | |
| 2009/0006103 | A1 | 1/2009 | Koishida et al. | |
| 2011/0002393 | A1 | 1/2011 | Suzuki et al. | |
| 2014/0112482 | A1 * | 4/2014 | Virette | G10L 19/008 381/23 |
| 2016/0005407 | A1 * | 1/2016 | Friedrich | H04S 3/008 381/23 |
| 2016/0005413 | A1 * | 1/2016 | Fellers | G10L 19/012 704/205 |
| 2016/0035369 | A1 | 2/2016 | Son et al. | |
| 2016/0111100 | A1 | 4/2016 | Ramo et al. | |
| 2016/0148618 | A1 * | 5/2016 | Huang | G10L 19/167 381/2 |
| 2016/0293174 | A1 | 10/2016 | Atti et al. | |
| 2017/0069329 | A1 | 3/2017 | Qi et al. | |
| 2019/0066701 | A1 * | 2/2019 | Fatus | G10L 19/008 |

FOREIGN PATENT DOCUMENTS

| | | | |
|---|---|---|---|
| CN | 102844808 | A | 12/2012 |
| CN | 103824557 | A | 5/2014 |
| CN | 105474308 | A | 4/2016 |
| CN | 106023999 | A | 10/2016 |
| CN | 103928030 | B | 3/2017 |
| CN | 107408392 | A | 11/2017 |
| WO | WO 2012/058805 | A1 | 5/2012 |
| WO | WO 2014/191793 | A1 | 12/2014 |

OTHER PUBLICATIONS

Hirvonen et al., "Perceptual Compression Methods for Metadata in Directional Audio Coding Applied to Audiovisual Teleconference", Audio Engineering Society Convention Paper 7706, 126th Convention (May 7-10, 2009), 8 pages.

International Search Report and Written Opinion for Patent Cooperation Treaty Application No. PCT/FI2019/050581 dated Nov. 28, 2019, 16 pages.

Peters et al., "Scene-Based Audio Implemented with Higher Order Ambisonics", SMPTE Motion Imaging Journal, vol. 125, No. 9 (Nov.-Dec. 2016), pp. 16-24.

Yang et al., "Multi-Channel Object-Based Spatial Parameter Compression Approach for 3D Audio", Advances in Multimedia Information Processing—PCM 2015, proceedings of the 16th Pacific-Rim Conference on Multimedia (Sep. 16-18, 2015), 11 pages.

Intention to Grant for European Application No. 19855639.1 dated Dec. 19, 2023, 7 pages.

Office Action for Chinese Application No. 201980070712.1 dated Mar. 26, 2024, 24 pages.

Intention to Grant for European Application No. 19855639.1 dated May 8, 2024, 49 pages.

Intention to Grant for European Application No. 19855639.1 dated Sep. 17, 2024, 48 pages.

Notice of Allowance for Chinese Application No. 201980070712.1 dated Aug. 9, 2024, 10 pages.

Intention to Grant for European Application No. 19855639.1 dated Feb. 13, 2025, 48 pages.

* cited by examiner

SPATIAL PARAMETER SIGNALLING

CROSS-REFERENCE TO RELATED APPLICATIONS

This application is a national phase entry of International Application No. PCT/FI2019/050581, filed Aug. 8, 2019, which claims priority to European Patent Application No. 1814227.3, filed Aug. 31, 2018, the entire contents of which are incorporated herein by reference.

FIELD

The present application relates to apparatus and methods for spatial parameter signalling, but not exclusively for spatial parameter signalling within and between spatial audio encoders and decoders.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

SUMMARY

There is provided according to a first aspect an apparatus comprising means for: obtaining at least one audio signal; obtaining at least one parameter respectively for each of at least two frequency bands associated with the at least one audio signal; and selecting a frequency band of the at least two frequency bands based on comparing at least one further respective parameter for each of the at least two frequency bands wherein the at least one further respective parameter is determined from each of the at least two frequency bands; generating an output comprising a selection of the at least one parameter associated with the selected frequency band of the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands.

The means for obtaining at least one parameter respectively for each of at least two frequency bands associated with the at least one audio signal may be further for obtaining a direction and energy respectively for each of the at least two frequency bands associated with the at least one audio signal, and wherein the means for selecting a frequency band of the at least two frequency bands based on comparing at least one further respective parameter for each of the at least two frequency bands may be further for: determining a directional energy weight factor for each of the at least two frequency bands based on the direction and energy for each of the at least two frequency bands, wherein the directional energy weight factor is the at least one further respective parameter for each of the at least two frequency bands; determining a weight limit factor based on an averaged energy; comparing the directional energy weight factor for each of the at least two frequency bands to the weight limit factor; and selecting a highest frequency band where the directional energy weight factor is greater than the weight limit factor.

The energy may be a normalized energy.

The means for selecting a frequency band of the at least two frequency bands based on comparing at least one further respective parameters for each of the at least two frequency bands may be further for selecting the highest frequency band of the at least two frequency bands.

The means for obtaining respectively at least one parameter for at least two frequency bands associated with the at least one audio signal may be further for obtaining at least one of: a directional parameter; a distance parameter; an energy parameter; and an energy ratio parameter.

The means for selecting a frequency band of the at least two frequency bands based on comparing at least one further respective parameter for each of the at least two frequency bands may be further for: saving the at least one parameter for one of the at least two frequency bands; and discarding any other of the at least one parameter for the at least two frequency bands, wherein the means for generating an output comprising a selection of the at least one parameter associated with the selected frequency band of the at least two frequency bands may be further for generating an output comprising the saved at least one parameter for one of the at least two frequency bands and not the discarded other of the at least one parameter for the at least two frequency bands.

The means for selecting a frequency band of the at least two frequency bands based on comparing at least one further respective parameters for each of the at least two frequency bands may be further for: saving the at least one parameter for one of the at least two frequency bands; and determining a difference between any other of the at least one parameter for the at least two frequency bands and the at least one parameter for one of the at least two frequency bands, wherein the means for generating an output comprising a selection of the at least one parameter associated with the selected frequency band of the at least two frequency bands may be further for generating an output further comprising the difference between any other of the at least one parameter for the at least two frequency bands and the at least one parameter for one of the at least two frequency bands.

The means are further for generating at least one transport signal based on the at least one audio signal and wherein the means for generating an output comprising a selection of the at least one parameter associated with the selected frequency band of the at least two frequency bands may be further for generating a datastream for storing/transmission based on a combination of the at least one parameter and the at least one transport signal.

The means for generating a datastream for storing/transmission based on a combination of the at least one parameter and the at least one transport signal may be further for: encoding the at least one transport signal; encoding the at least one parameter associated with the selected frequency band of the at least two frequency bands; and combining the encoded transport signal and the encoded at least one parameter associated with the selected frequency band of the at least two frequency bands.

The means for generating at least one transport signal based on the at least one audio signal may be further for at least one of: downmixing the at least one audio signal; selecting at least one audio signal from the at least one audio signal, when the at least one audio signal comprises two or more audio signals; generating directional signals directed to different directions, when the at least one audio signal comprises first order ambisonic audio signals; generating cardioid signals directed to different directions, when the at least one audio signal comprises first order ambisonic audio signals; generating cardioid signals directed at opposite directions, when the at least one audio signal comprises first order ambisonic audio signals; and passing at least one transport audio signal, when the at least one audio signal comprises at least one transport audio signal.

According to a second aspect there is provided an apparatus comprising means for: obtaining at least one signal, the at least one signal comprising at least one parameter associated with a selected frequency band from at least two frequency bands and at least one transport signal; replicating, based on the at least one parameter for one of the at least two frequency bands and a transport signal, at least one parameter for at least one other of the at least two frequency bands; and synthesising at least two audio signals based on the at least one parameter associated with the selected frequency band from at least two frequency bands and at least one replicated parameter for the at least one other of the at least two frequency bands and the transport signal, wherein the at least two audio signals are configured to provide spatial audio reproduction.

The means for obtaining at least one signal, the at least one signal comprising at least one parameter associated with a selected frequency band from at least two frequency bands may be further for obtaining at least one of: a directional parameter; a distance parameter; an energy parameter; and an energy ratio parameter.

The means for replicating, based on the at least one parameter for one of the at least two frequency bands, at least one parameter for at least one other of the at least two frequency bands may be further for copying the at least one parameter for one of the at least two frequency bands as the at least one other of the at least two frequency bands.

The at least one signal may further comprise at least one parameter associated with a difference between at least one other of the at least two frequency bands and the at least one parameter for one of the at least two frequency bands, wherein the means for replicating, based on the at least one parameter for one of the at least two frequency bands, at least one parameter for at least one other of the at least two frequency bands may be further for replicating the at least one parameter for at least one other of the at least two frequency bands based on a combination of the at least one parameter for one of the at least two frequency bands and the at least one parameter associated with a difference between at least one other of the at least two frequency bands and the at least one parameter for one of the at least two frequency bands.

According to a third aspect there is provided a method comprising: obtaining at least one audio signal; obtaining at least one parameter respectively for each of at least two frequency bands associated with the at least one audio signal; and selecting a frequency band of the at least two frequency bands based on comparing at least one further respective parameter for each of the at least two frequency bands wherein the at least one further respective parameter is determined from each of the at least two frequency bands; generating an output comprising a selection of the at least one parameter associated with the selected frequency band of the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands.

Obtaining at least one parameter respectively for each of at least two frequency bands associated with the at least one audio signal may comprise obtaining a direction and energy respectively for each of the at least two frequency bands associated with the at least one audio signal, and wherein selecting a frequency band of the at least two frequency bands based on comparing at least one further respective parameter for each of the at least two frequency bands may comprise: determining a directional energy weight factor for each of the at least two frequency bands based on the direction and energy for each of the at least two frequency bands, wherein the directional energy weight factor is the at least one further respective parameter for each of the at least two frequency bands; determining a weight limit factor based on an averaged energy; comparing the directional energy weight factor for each of the at least two frequency bands to the weight limit factor; and selecting a highest frequency band where the directional energy weight factor is greater than the weight limit factor.

The energy may be a normalized energy.

Selecting a frequency band of the at least two frequency bands based on comparing at least one further respective parameters for each of the at least two frequency bands may comprise selecting the highest frequency band of the at least two frequency bands.

Obtaining respectively at least one parameter for at least two frequency bands associated with the at least one audio signal may comprise obtaining at least one of: a directional parameter; a distance parameter; an energy parameter; and an energy ratio parameter.

Selecting a frequency band of the at least two frequency bands based on comparing at least one further respective parameter for each of the at least two frequency bands may comprise: saving the at least one parameter for one of the at least two frequency bands; and discarding any other of the at least one parameter for the at least two frequency bands, wherein generating an output comprising a selection of the at least one parameter associated with the selected frequency band of the at least two frequency bands may comprise generating an output comprising the saved at least one parameter for one of the at least two frequency bands and not the discarded other of the at least one parameter for the at least two frequency bands.

Selecting a frequency band of the at least two frequency bands based on comparing at least one further respective parameters for each of the at least two frequency bands may comprise: saving the at least one parameter for one of the at least two frequency bands; and determining a difference between any other of the at least one parameter for the at least two frequency bands and the at least one parameter for one of the at least two frequency bands, wherein generating an output comprising a selection of the at least one parameter associated with the selected frequency band of the at least two frequency bands may comprise generating an output further comprising the difference between any other of the at least one parameter for the at least two frequency bands and the at least one parameter for one of the at least two frequency bands.

The method may further comprise generating at least one transport signal based on the at least one audio signal and wherein generating an output comprising a selection of the at least one parameter associated with the selected frequency band of the at least two frequency bands may comprise generating a datastream for storing/transmission based on a combination of the at least one parameter and the at least one transport signal.

Generating a datastream for storing/transmission based on a combination of the at least one parameter and the at least one transport signal may further comprise: encoding the at least one transport signal; encoding the at least one parameter associated with the selected frequency band of the at least two frequency bands; and combining the encoded transport signal and the encoded at least one parameter associated with the selected frequency band of the at least two frequency bands.

Generating at least one transport signal based on the at least one audio signal may further comprise at least one of: downmixing the at least one audio signal; selecting at least one audio signal from the at least one audio signal, when the at least one audio signal comprises two or more audio signals; generating directional signals directed to different directions, when the at least one audio signal comprises first order ambisonic audio signals; generating cardioid signals directed to different directions, when the at least one audio signal comprises first order ambisonic audio signals; generating cardioid signals directed at opposite directions, when the at least one audio signal comprises first order ambisonic audio signals; and passing at least one transport audio signal, when the at least one audio signal comprises at least one transport audio signal.

According to a fourth aspect there is provided a method comprising: obtaining at least one signal, the at least one signal comprising at least one parameter associated with a selected frequency band from at least two frequency bands and at least one transport signal; replicating, based on the at least one parameter for one of the at least two frequency bands and a transport signal, at least one parameter for at least one other of the at least two frequency bands; and synthesising at least two audio signals based on the at least one parameter associated with the selected frequency band from at least two frequency bands and at least one replicated parameter for the at least one other of the at least two frequency bands and the transport signal, wherein the at least two audio signals are configured to provide spatial audio reproduction.

Obtaining at least one signal, the at least one signal comprising at least one parameter associated with a selected frequency band from at least two frequency bands may further comprise obtaining at least one of: a directional parameter; a distance parameter; an energy parameter; and an energy ratio parameter.

Replicating, based on the at least one parameter for one of the at least two frequency bands, at least one parameter for at least one other of the at least two frequency bands may be further comprise copying the at least one parameter for one of the at least two frequency bands as the at least one other of the at least two frequency bands.

The at least one signal may further comprise at least one parameter associated with a difference between at least one other of the at least two frequency bands and the at least one parameter for one of the at least two frequency bands, wherein replicating, based on the at least one parameter for one of the at least two frequency bands, at least one parameter for at least one other of the at least two frequency bands may further comprise replicating the at least one parameter for at least one other of the at least two frequency bands based on a combination of the at least one parameter for one of the at least two frequency bands and the at least one parameter associated with a difference between at least one other of the at least two frequency bands and the at least one parameter for one of the at least two frequency bands.

According to a fifth aspect there is provided an apparatus comprising at least one processor and at least one memory including a computer program code, the at least one memory and the computer program code configured to, with the at least one processor, cause the apparatus at least to: obtain at least one audio signal; obtain at least one parameter respectively for each of at least two frequency bands associated with the at least one audio signal; and select a frequency band of the at least two frequency bands based on comparing at least one further respective parameter for each of the at least two frequency bands wherein the at least one further respective parameter is determined from each of the at least two frequency bands; generate an output comprising a selection of the at least one parameter associated with the selected frequency band of the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands.

The apparatus caused to obtain at least one parameter respectively for each of at least two frequency bands associated with the at least one audio signal may be further be caused to obtain a direction and energy respectively for each of the at least two frequency bands associated with the at least one audio signal, and wherein the apparatus caused to select at least one frequency band of the at least two frequency bands based on comparing at least one further respective parameter for each of the at least two frequency bands may be further be caused to: determine a directional energy weight factor for each of the at least two frequency bands based on the direction and energy for each of the at least two frequency bands, wherein the directional energy weight factor is the at least one further respective parameter for each of the at least two frequency bands; determine a weight limit factor based on an averaged energy; compare the directional energy weight factor for each of the at least two frequency bands to the weight limit factor; and select a highest frequency band where the directional energy weight factor is greater than the weight limit factor.

The energy may be a normalized energy.

The apparatus caused to select at least one frequency band of the at least two frequency bands based on comparing at least one further respective parameters for each of the at least two frequency bands may be further caused to select the highest frequency band of the at least two frequency bands.

The apparatus caused to obtain respectively at least one parameter for at least two frequency bands associated with the at least one audio signal may be further caused to obtain at least one of: a directional parameter; a distance parameter; an energy parameter; and an energy ratio parameter.

The apparatus caused to select at least one frequency band of the at least two frequency bands based on comparing at least one further respective parameter for each of the at least two frequency bands may be further caused to: save the at least one parameter for one of the at least two frequency bands; and discard any other of the at least one parameter for the at least two frequency bands, wherein the apparatus caused to generate an output comprising a selection of the at least one parameter associated with the selected frequency band of the at least two frequency bands may be further caused to generate an output comprising the saved at least one parameter for one of the at least two frequency bands and not the discarded other of the at least one parameter for the at least two frequency bands.

The apparatus caused to select at least one frequency band of the at least two frequency bands based on comparing at least one further respective parameters for each of the at least two frequency bands may be further cause to: save the at least one parameter for one of the at least two frequency bands; and determine a difference between any other of the at least one parameter for the at least two frequency bands and the at least one parameter for one of the at least two frequency bands, wherein the apparatus caused to generate an output comprising a selection of the at least one parameter associated with the selected frequency band of the at least two frequency bands may be further caused to generate an output further comprising the difference between any other of the at least one parameter for the at least two frequency bands and the at least one parameter for one of the at least two frequency bands.

The apparatus may be further caused to generate at least one transport signal based on the at least one audio signal and wherein the apparatus caused to generate an output comprising a selection of the at least one parameter associated with the selected frequency band of the at least two frequency bands may be further caused to generate a datastream for storing/transmission based on a combination of the at least one parameter and the at least one transport signal.

The apparatus caused to generate a datastream for storing/transmission based on a combination of the at least one parameter and the at least one transport signal may be further caused to: encode the at least one transport signal; encode the at least one parameter associated with the selected frequency band of the at least two frequency bands; and combine the encoded transport signal and the encoded at least one parameter associated with the selected frequency band of the at least two frequency bands.

The apparatus caused to generate at least one transport signal based on the at least one audio signal may be further caused to perform least one of: downmix the at least one audio signal; selecting at least one audio signal from the at least one audio signal, when the at least one audio signal comprises two or more audio signals; generate directional signals directed to different directions, when the at least one audio signal comprises first order ambisonic audio signals; generate cardioid signals directed to different directions, when the at least one audio signal comprises first order ambisonic audio signals; generate cardioid signals directed at opposite directions, when the at least one audio signal comprises first order ambisonic audio signals; and pass at least one transport audio signal, when the at least one audio signal comprises at least one transport audio signal.

According to a sixth aspect there is provided an apparatus comprising at least one processor and at least one memory including a computer program code, the at least one memory and the computer program code configured to, with the at least one processor, cause the apparatus at least to: obtain at least one signal, the at least one signal comprising at least one parameter associated with a selected frequency band from at least two frequency bands and at least one transport signal; replicate, based on the at least one parameter for one of the at least two frequency bands and a transport signal, at least one parameter for at least one other of the at least two frequency bands; and synthesise at least two audio signals based on the at least one parameter associated with the selected frequency band from at least two frequency bands and at least one replicated parameter for the at least one other of the at least two frequency bands and the transport signal, wherein the at least two audio signals are configured to provide spatial audio reproduction.

The apparatus caused to obtain at least one signal, the at least one signal comprising at least one parameter associated with a selected frequency band from at least two frequency bands may be further caused to obtain at least one of: a directional parameter; a distance parameter; an energy parameter; and an energy ratio parameter.

The apparatus caused to replicate, based on the at least one parameter for one of the at least two frequency bands, at least one parameter for at least one other of the at least two frequency bands may be further caused to copy the at least one parameter for one of the at least two frequency bands as the at least one other of the at least two frequency bands.

The at least one signal may further comprise at least one parameter associated with a difference between at least one other of the at least two frequency bands and the at least one parameter for one of the at least two frequency bands, wherein the apparatus caused to replicate, based on the at least one parameter for one of the at least two frequency bands, at least one parameter for at least one other of the at least two frequency bands may be further caused to replicate the at least one parameter for at least one other of the at least two frequency bands based on a combination of the at least one parameter for one of the at least two frequency bands and the at least one parameter associated with a difference between at least one other of the at least two frequency bands and the at least one parameter for one of the at least two frequency bands.

According to a seventh aspect there is provided a computer program comprising instructions [or a computer readable medium comprising program instructions] for causing an apparatus to perform at least the following: obtaining at least one audio signal; obtaining at least one parameter respectively for each of at least two frequency bands associated with the at least one audio signal; and selecting a frequency band of the at least two frequency bands based on comparing at least one further respective parameter for each of the at least two frequency bands wherein the at least one further respective parameter is determined from each of the at least two frequency bands; generating an output comprising a selection of the at least one parameter associated with the selected frequency band of the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands.

According to an eighth aspect there is provided a computer program comprising instructions [or a computer readable medium comprising program instructions] for causing an apparatus to perform at least the following: obtaining at least one signal, the at least one signal comprising at least one parameter associated with a selected frequency band from at least two frequency bands and at least one transport signal; replicating, based on the at least one parameter for one of the at least two frequency bands and a transport signal, at least one parameter for at least one other of the at least two frequency bands; and synthesising at least two audio signals based on the at least one parameter associated with the selected frequency band from at least two frequency bands and at least one replicated parameter for the at least one other of the at least two frequency bands and the transport signal, wherein the at least two audio signals are configured to provide spatial audio reproduction.

According to a ninth aspect there is provided a non-transitory computer readable medium comprising program instructions for causing an apparatus to perform at least the following: obtaining at least one audio signal; obtaining at least one parameter respectively for each of at least two frequency bands associated with the at least one audio signal; and selecting a frequency band of the at least two frequency bands based on comparing at least one further respective parameter for each of the at least two frequency bands wherein the at least one further respective parameter is determined from each of the at least two frequency bands; generating an output comprising a selection of the at least one parameter associated with the selected frequency band of the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands.

According to a tenth aspect there is provided a non-transitory computer readable medium comprising program instructions for causing an apparatus to perform at least the following: obtaining at least one signal, the at least one signal comprising at least one parameter associated with a selected frequency band from at least two frequency bands and at least one transport signal; replicating, based on the at least one parameter for one of the at least two frequency bands and a transport signal, at least one parameter for at least one other of the at least two frequency bands; and synthesising at least two audio signals based on the at least one parameter associated with the selected frequency band from at least two frequency bands and at least one replicated parameter for the at least one other of the at least two frequency bands and the transport signal, wherein the at least two audio signals are configured to provide spatial audio reproduction.

According to an eleventh aspect there is provided a computer readable medium comprising program instructions for causing an apparatus to perform at least the following: obtaining at least one audio signal; obtaining at least one parameter respectively for each of at least two frequency bands associated with the at least one audio signal; and selecting a frequency band of the at least two frequency bands based on comparing at least one further respective parameter for each of the at least two frequency bands wherein the at least one further respective parameter is determined from each of the at least two frequency bands; generating an output comprising a selection of the at least one parameter associated with the selected frequency band of the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands.

According to a twelfth aspect there is provided a computer readable medium comprising program instructions for causing an apparatus to perform at least the following: obtaining at least one signal, the at least one signal comprising at least one parameter associated with a selected frequency band from at least two frequency bands and at least one transport signal; replicating, based on the at least one parameter for one of the at least two frequency bands and a transport signal, at least one parameter for at least one other of the at least two frequency bands; and synthesising at least two audio signals based on the at least one parameter associated with the selected frequency band from at least two frequency bands and at least one replicated parameter for the at least one other of the at least two frequency bands and the transport signal, wherein the at least two audio signals are configured to provide spatial audio reproduction.

According to a thirteenth aspect there is provided a computer readable medium comprising program instructions for causing an apparatus to perform at least the following: obtaining at least one audio signal; obtaining at least one parameter respectively for each of at least two frequency bands associated with the at least one audio signal; and selecting a frequency band of the at least two frequency bands based on comparing at least one further respective parameter for each of the at least two frequency bands wherein the at least one further respective parameter is determined from each of the at least two frequency bands; generating an output comprising a selection of the at least one parameter associated with the selected frequency band of the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands.

According to a fourteenth aspect there is provided a computer readable medium comprising program instructions for causing an apparatus to perform at least the following: obtaining at least one signal, the at least one signal comprising at least one parameter associated with a selected frequency band from at least two frequency bands and at least one transport signal; replicating, based on the at least one parameter for one of the at least two frequency bands and a transport signal, at least one parameter for at least one other of the at least two frequency bands; and synthesising at least two audio signals based on the at least one parameter associated with the selected frequency band from at least two frequency bands and at least one replicated parameter for the at least one other of the at least two frequency bands and the transport signal, wherein the at least two audio signals are configured to provide spatial audio reproduction.

According to a fifteenth aspect there is provided an apparatus comprising: audio signal obtaining circuitry configured to obtain at least one audio signal; parameter obtaining circuitry configured to obtain at least one parameter respectively for each of at least two frequency bands associated with the at least one audio signal; and selecting circuitry configured to select a frequency band of the at least two frequency bands based on comparing at least one further respective parameter for each of the at least two frequency bands wherein the at least one further respective parameter is determined from each of the at least two frequency bands; output generating circuitry configured to generate an output comprising a selection of the at least one parameter associated with the selected frequency band of the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands.

According to a sixteenth aspect there is provided an apparatus comprising: signal obtaining circuitry configured to obtain at least one signal, the at least one signal comprising at least one parameter associated with a selected frequency band from at least two frequency bands and at least one transport signal; replicating circuitry configured to replicate, based on the at least one parameter for one of the at least two frequency bands and a transport signal, at least one parameter for at least one other of the at least two frequency bands; and synthesising circuitry configured to synthesise at least two audio signals based on the at least one parameter associated with the selected frequency band from at least two frequency bands and at least one replicated parameter for the at least one other of the at least two frequency bands and the transport signal, wherein the at least two audio signals are configured to provide spatial audio reproduction.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
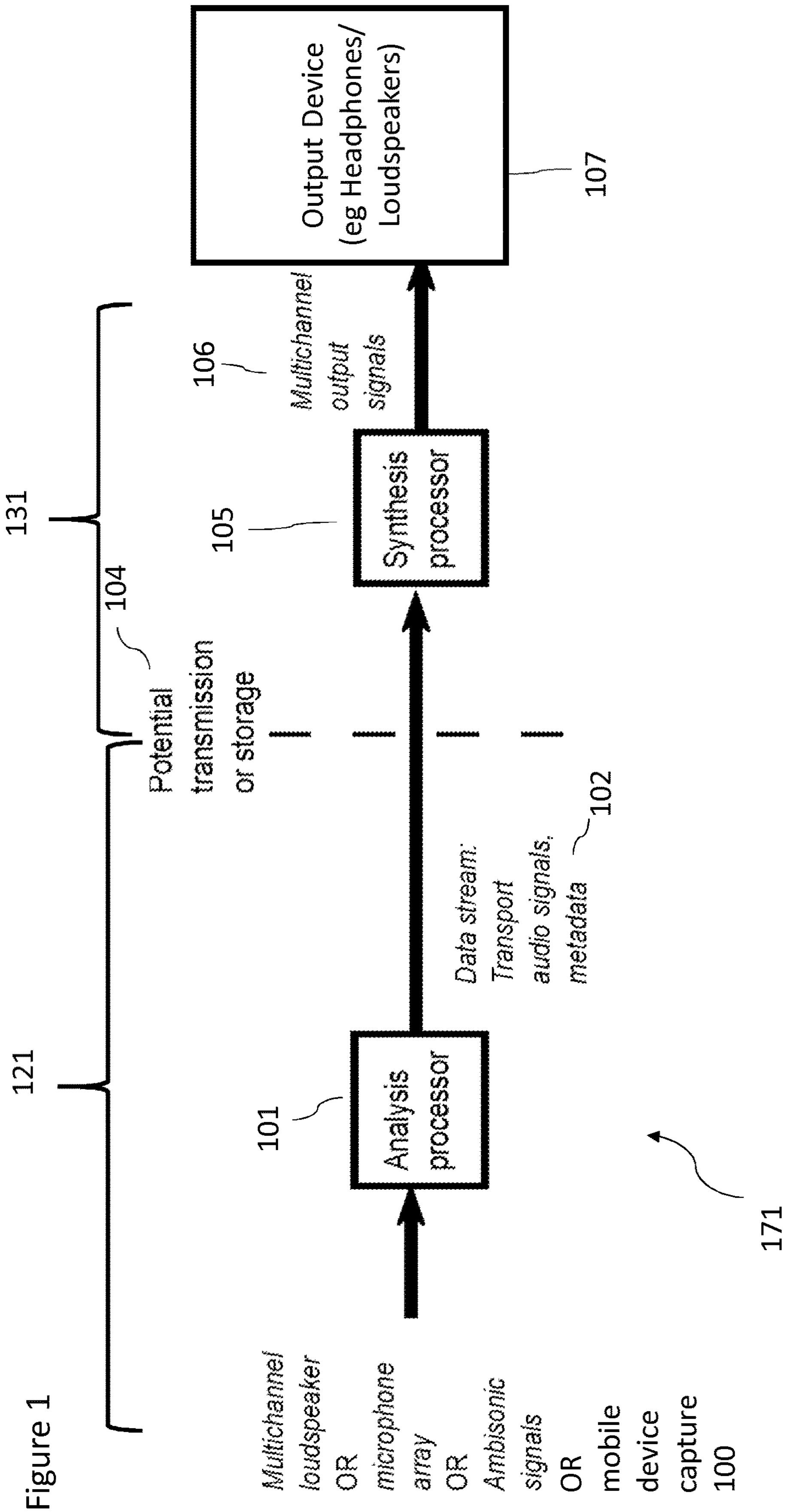
FIG. 1 shows schematically a system of apparatus suitable for implementing some embodiments.

The following describes in further detail suitable apparatus and possible mechanisms for the provision of effective spatial analysis derived metadata parameters associated with energy ratios for microphone array and other input format audio signals.

Apparatus has been designed to transmit a spatial audio modelling of a sound field using Q (which is typically 2) transport audio signals and spatial metadata. The transport audio signals are typically compressed with a suitable audio encoding scheme (for example advanced audio coding—AAC or enhanced voice services—EVS codecs). The spatial metadata may contain parameters such as Direction (for example azimuth, elevation) in time-frequency domain.

Furthermore other parameters which may be determined and signalled to a renderer or receiver is one or more direct-to-total energy ratios (in the time-frequency domain) which represents the distribution of energy between each specific direction and the total audio energy. Another parameter may be one (or more where practical) diffuse-to-total energy ratio (in the time-frequency domain) which represents distribution of energy between ambient or diffuse signal (i.e., non-directional signal such as reverberation) and total energy.

The parametric spatial audio signals may be represented as Q channels+metadata. This format can be compressed in encoding to efficiently store it for later retrieval or transmit it over a suitable transmission channel. Various methods can be used depending on how the channels are configured and what the metadata contains.

A common procedure is to define a constant bitrate budget for the whole bitstream that contains audio channels and the metadata. This bitrate budget can then be divided statically or adaptively (dynamically) between audio channels and metadata.

For example, a bitrate budget of 64 kb/s for 2-channels+metadata could be used in various ways. Using the full 64 kb/s for the 2 audio channels would offer very good quality for encoding the stereo signal (for example using an EVS codec), but in this example the metadata would not be transmitted. In using 56 kb/s for the audio and 8 kb/s for metadata would usually provide a higher overall quality as the difference in audio coding quality is not large but the signalled metadata can provide full 3d surround reproduction.

With lower bitrates, dividing the bitrate budget becomes even more difficult. For example with a 16 kb/s budget, there may be the following coding modes:

One channel audio 16 kb/s
One channel audio 15 kb/s+1 kb/s metadata
One channel audio 11 kb/s+5 kb/s metadata
Two channel audio 16 kb/s
Two channel audio 15 kb/s+1 kb/s metadata
Two channel audio 11 kb/s+5 kb/s metadata Optimizing between these example modes may require listening experiments. However, previous experiments have shown that with such low bitrates offering more bitrate to the raw audio quality over multiple channels tends to offer better perceived quality. The effect of metadata bitrate budgeting is that reducing the metadata bitrate such that the audio signal receives at least 90% of the total bitrate budget is believed to be a good target.

However the amount of metadata generated and therefore the amount of data defining spatial parameters is frequency band related. For example, for B (e.g., 5, 10, 20, or 30) frequency bands and two parameters (direction and energy ratio) for each time frame, there may be at minimum 2*B*K (K is number of bits per parameter) bits of metadata per time frame. Assuming the common number of 50 frames per second, B=5, and K=10 there may be 5 kb/s metadata generated. With low bitrate applications (such as IVAS) the total target bitrate with audio can be so low as 14 kb/s so the metadata would take a big portion of the bitrate budget even after entropy coding (which may reduce the bitrate to half of the generated total).

Currently, attempts to reduce the generated include reducing bit accuracy per parameter or even removing less important parameters when the bitrate budget is low. Another approach is to reduce the number of frequency bands for metadata, for example generating just one parameter per timeframe and thus producing a reduction of generated metadata by B. One method for achieving this is to perform a wideband analysis (in other words assume only one frequency band for the full audible frequency range) and encode this wideband group.

The concept as discussed herein attempts to improve on these methods and in particular, instead of wideband analysis, attempts to:

- require a single analysis system for different bitrates (and therefore not one band analysis for low bitrates, multiple band analysis for high bitrates); and
- improve for the sound scene time-frequency resolution in a practical manner suitable for the human hearing range.

Thus, the concept as discussed in further detail in the embodiments herein implements an analysis system with multiple bands and then selects the best frequency band to represent the current time frame.

The embodiments discussed herein therefore attempt to reduce the bitrate by selecting one frequency band from the analysed metadata to represent all frequency bands. This reduces bitrate usage by factor of B (where B is the original number of frequency bands). The selection process in some embodiments may thus relate to audio encoding and decoding using a sound-field related parametrization (e.g., direction(s) and direct-to-total energy ratio(s) in frequency bands) where a solution is provided for automatically reducing the bitrate of the direction parameters by transmitting only one direction value for all frequency bands and where the transmitted one direction value is determined by:

- obtaining audio signals;
- determining (spatial parameters) directions and direct-to-total energy ratios in frequency bands;
- determining normalized energy in frequency bands;
- determining directional energy weight factor (e.g., energy multiplied by direct-to-total energy ratio);
- determining the highest frequency band with directional energy weight factor above a threshold;
- encoding/storing/transmitting only the direction of the determined band.

This may be further expanded or detailed as analysis apparatus configured to:

- Obtain multichannel audio signals (for example Capture spatial audio signals);
- Apply time-frequency transform to the multichannel audio signals;
- Perform spatial analysis for the transformed signal;
- Calculate normalized energy for each frequency band for the transformed signal;
- Calculate frequency band weight factor for each band (energy multiplied with energy ratio) for the transformed signal;
- Choose or select a highest band that has a weight factor over defined limit (e.g., 0.5);
- Discard other metadata and save only the metadata for the chosen frequency band;
- Create transport signals;
- Encode and transmit/store transport signals and metadata.
- With respect to the synthesis apparatus it is then configured to:
- Obtain (receive/retrieve) the transmitted/stored transport signals and metadata; replicate the selected/chosen metadata to all frequency bands; and
- Synthesize output using transport signals and replicated metadata.

The directions and the direct-to-total energy ratios can be estimated using any suitable method (e.g., SPAC), and depends on the type of the audio signals (e.g., microphone-array, Ambisonics, multichannel audio signals).

The normalized energy can be estimated as discussed in the embodiments herein in a suitable manner. For example by computing the sum of squares of the frequency-domain samples and dividing with the largest energy.

The threshold value may in some embodiments be determined for example by multiplying the average normalized energy by a factor.

In addition to the direction, also all other parameters (e.g., direct-to-total energy ratios) may be encoded using the same scheme. In other words transmitting only one parameter value for all frequency bands. The value to be transmitted can be selected using the same procedure.

The decoding can be performed using any suitable method for example by using the same parameter value at all frequency bands.

In some embodiments, in encoding, the selected frequency band can be used as a reference band and a very low bitrate difference coding related to it determined for other bands.

With respect to FIG. 1 an example apparatus and system for implementing embodiments of the application are shown. The system 171 is shown with an 'analysis' part 121 and a 'synthesis' part 131. The 'analysis' part 121 is the part from receiving the input (multichannel loudspeaker, microphone array, ambisonics, or mobile device capture) audio signals 100 up to an encoding of the metadata and transport signal 102 which may be transmitted or stored 104. The 'synthesis' part 131 may be the part from a decoding of the encoded metadata and transport signal 104 to the presentation of the synthesized signal (for example in multi-channel loudspeaker form 106 via loudspeakers 107 or binaural or ambisonic formats).

The input to the system 171 and the 'analysis' part 121 is therefore audio signals 100. These may be suitable input multichannel loudspeaker audio signals, microphone array audio signals, ambisonic audio signals, or mobile captured audio signals.

The input audio signals 100 may be passed to an analysis processor 101. The analysis processor 101 may be configured to receive the input audio signals and generate a suitable data stream 104 comprising suitable transport signals. The transport audio signals may also be known as associated audio signals and be based on the audio signals. For example in some embodiments the transport signal generator 103 is configured to downmix or otherwise select or combine, for example, by beamforming techniques the input audio signals to a determined number of channels and output these as transport signals. In some embodiments the analysis processor is configured to generate a 2-audio-channel output of the microphone array audio signals. The determined number of channels may be two or any suitable number of channels.

In some embodiments the analysis processor is configured to pass the received input audio signals 100 unprocessed to an encoder in the same manner as the transport signals. In some embodiments the analysis processor 101 is configured to select one or more of the microphone audio signals and output the selection as the transport signals 104. In some embodiments the analysis processor 101 is configured to apply any suitable encoding or quantization to the transport audio signals.

In some embodiments the analysis processor 101 is also configured to analyse the input audio signals 100 to produce metadata associated with the input audio signals (and thus associated with the transport signals). The analysis processor 101 can, for example, be a computer (running suitable software stored on memory and on at least one processor), mobile device, or alternatively a specific device utilizing, for example, FPGAs or ASICs. As shown herein in further detail the metadata may comprise, for each time-frequency analysis interval, at least one direction parameter and at least one energy ratio parameter. The at least one direction parameter and the at least one energy ratio parameter may in some embodiments be considered to be spatial audio parameters. In other words the spatial audio parameters comprise parameters which aim to characterize the sound-field of the input audio signals.

In some embodiments the parameters generated may differ from frequency band to frequency band and may be dependent on the transmission bit rate. Thus for example in band X all of the parameters are generated and transmitted, whereas in band Y only one of the parameters is generated and transmitted, and furthermore in band Z any other number of parameters are generated or transmitted. A practical example of this may be that for some frequency bands such as the highest band some of the parameters are not required for perceptual reasons.

The transport signals and the metadata 102 may be transmitted or stored, this is shown in FIG. 1 by the dashed line 104. Before the transport signals and the metadata are transmitted or stored they may in some embodiments be coded in order to reduce bit rate, and multiplexed to one stream. The encoding and the multiplexing may be implemented using any suitable scheme.

In the decoder side 131, the received or retrieved data (stream) may be input to a synthesis processor 105. The synthesis processor 105 may be configured to demultiplex the data (stream) to coded transport and metadata. The synthesis processor 105 may then decode any encoded streams in order to obtain the transport signals and the metadata.

The synthesis processor 105 may then be configured to receive the transport signals and the metadata and create a suitable multi-channel audio signal output 106 (which may be any suitable output format such as binaural, multi-channel loudspeaker or Ambisonics signals, depending on the use case) based on the transport signals and the metadata. In some embodiments with headphone or loudspeaker reproduction, an actual physical sound field is reproduced (using the output device 107 for example loudspeakers/headphones etc) having the desired perceptual properties. In other embodiments, the reproduction of a sound field may be understood to refer to reproducing perceptual properties of a sound field by other means than reproducing an actual physical sound field in a space. For example, the desired perceptual properties of a sound field can be reproduced over headphones using the binaural reproduction methods as described herein. In another example, the perceptual properties of a sound field could be reproduced as an Ambisonic output signal, and these Ambisonic signals can be reproduced with Ambisonic decoding methods to provide for example a binaural output with the desired perceptual properties.

The synthesis processor 105 can in some embodiments be a computer (running suitable software stored on memory and on at least one processor), mobile device, or alternatively a specific device utilizing, for example, FPGAs or ASICs.

Figure 2:
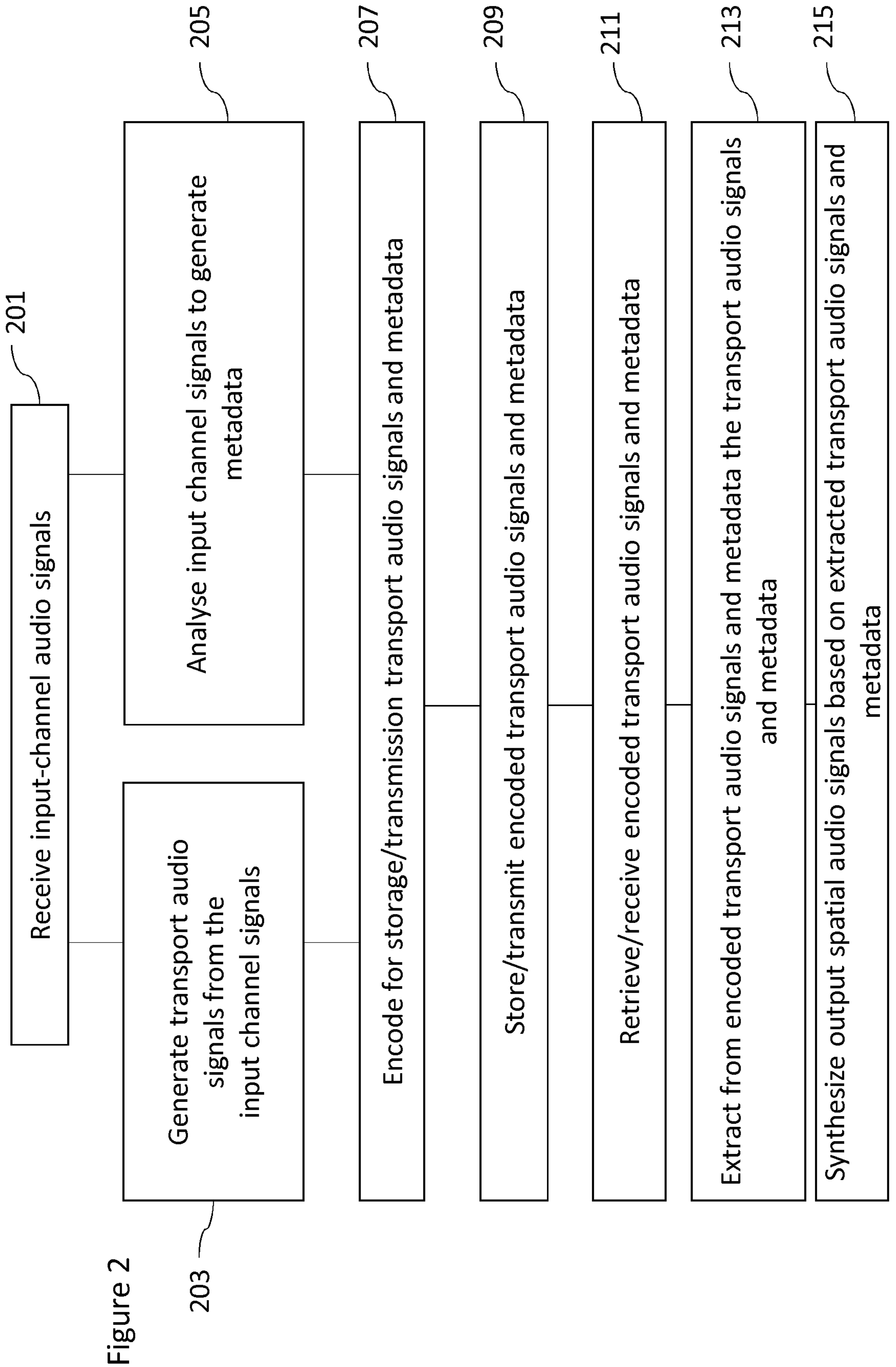
FIG. 2 shows a flow diagram of the operation of the system as shown in FIG. 1 according to some embodiments.

With respect to FIG. 2 an example flow diagram of the overview shown in FIG. 1 is shown.

First the system (analysis part) is configured to receive input audio signals or suitable multichannel input as shown in FIG. 2 by step 201.

Then the system (analysis part) is configured to generate a transport signal channels or transport signals (for example downmix/selection/beamforming based on the multichannel input audio signals) as shown in FIG. 2 by step 203.

Also the system (analysis part) is configured to analyse the audio signals to generate metadata: Directions; Energy ratios as shown in FIG. 2 by step 205.

The system is then configured to (optionally) encode for storage/transmission the transport signals and metadata as shown in FIG. 2 by step 207.

After this the system may store/transmit the transport signals and metadata as shown in FIG. 2 by step 209.

The system may retrieve/receive the transport signals and metadata as shown in FIG. 2 by step 211.

Then the system is configured to extract from the transport signals and metadata as shown in FIG. 2 by step 213.

The system (synthesis part) is configured to synthesize an output spatial audio signals (which as discussed earlier may be any suitable output format such as binaural, multi-channel loudspeaker or Ambisonics signals, depending on the use case) based on extracted audio signals and metadata as shown in FIG. 2 by step 215.

Figure 3:
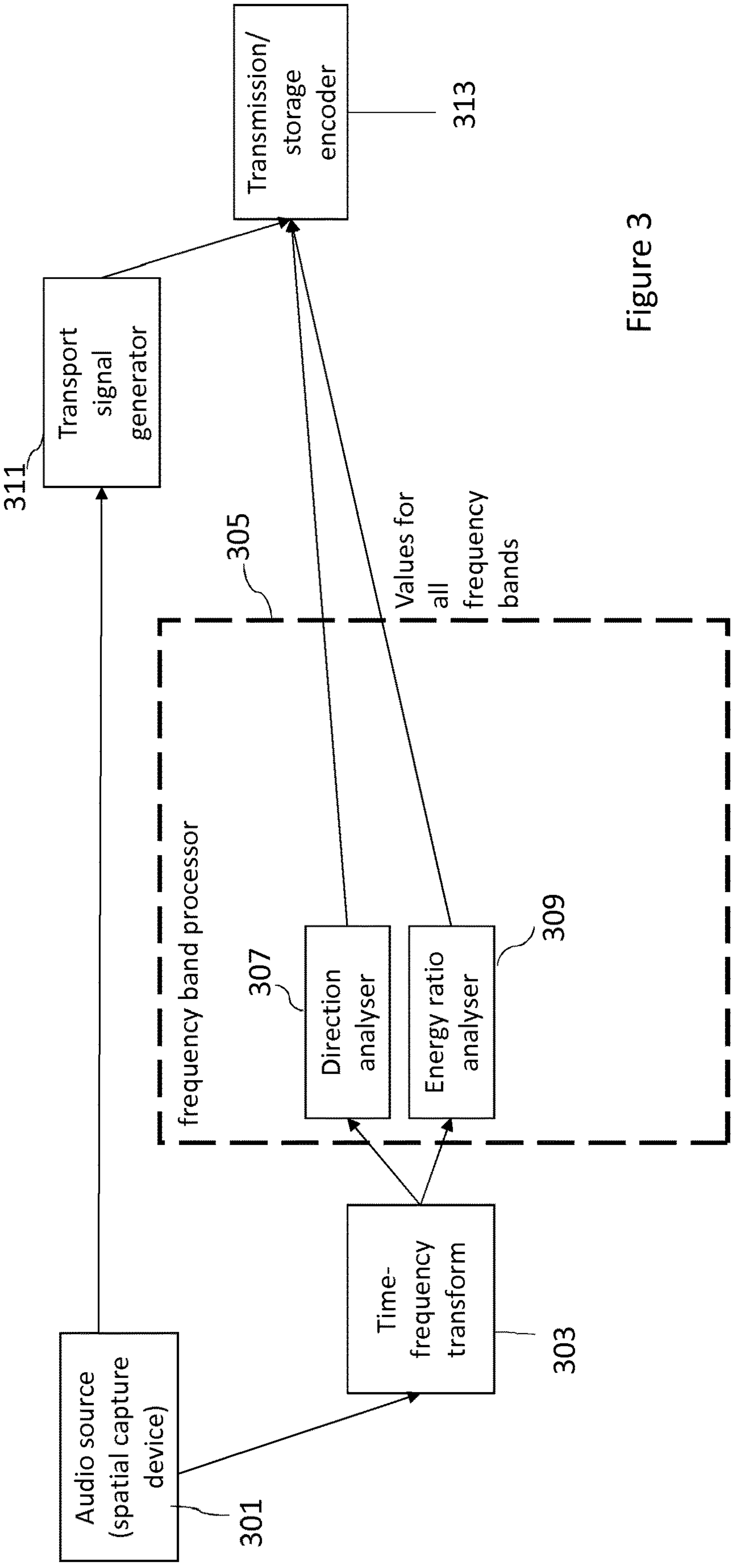
FIG. 3 shows schematically capture/encoding apparatus.

With respect to FIG. 3 an example analysis processor 101 is shown where the input audio signal is provided from an audio source 301 which in this example is a spatial capture device configured to generate multichannel audio signals from multiple microphones. The multichannel audio signals in this example are passed to a transport (audio) signal generator 311. The transport signal generator 311 is configured to generate the transport audio signals according to any of the options described previously. For example the transport signals may be downmixed from the input signals. The number of the transport audio signals may be any number and may be 2 or more or fewer than 2.

In the example shown in FIG. 3 the multichannel audio signals are also input to a time frequency transform 303. The time frequency transform 303 may be configured to generate suitable time-frequency representations of the multichannel audio signals and pass these to a frequency band processor 307.

The frequency band processor 305 is configured to generate spatial metadata outputs such as shown as the directions, direct-to-total energy ratios, and in some embodiments other types of energy ratios such as diffuse-to-total energy ratio(s) and remainder-to-total energy ratio(s).

The implementation of the analysis may be any suitable implementation that produces the described metadata outputs.

Thus for example in some embodiments the frequency band processor 305 comprises a direction analyser 307 configured to generate the direction metadata and an energy ratio analyser 309 configured to generate the energy ratio metadata.

The direction and energy ratio metadata for all of the analysed frequency bands may then be passed to a transmission/storage encoder 313. The transmission/storage encoder 313 may be configured to combine and encode the transport signals, the directions, and the energy ratios to generate the data stream 102.

For example in some embodiments the transmission/storage encoder 313 may comprise a suitable transport signal compressor/encoder configured to compress the audio signals using a suitable codec (e.g., AAC or EVS).

Figure 4:
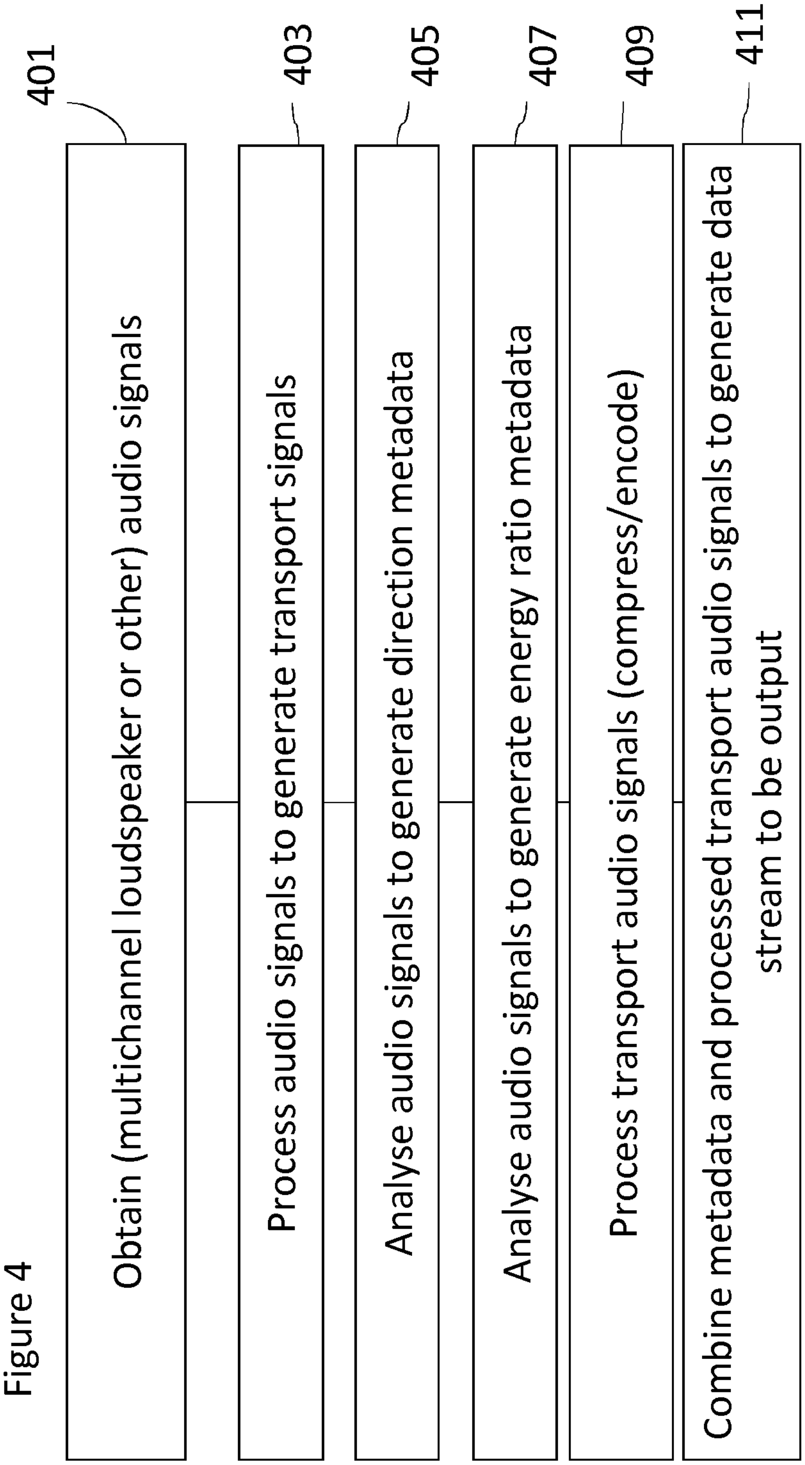
FIG. 4 shows a flow diagram of the operation of capture/encoding apparatus as shown in FIG. 3.

With respect to FIG. 4 is shown a flow diagram of the operation of the analysis processor.

The first operation is one of receiving the (multichannel loudspeaker or other) audio signals as shown in FIG. 4 by step 401.

In some embodiments the audio signals are processed in some form to generate the transport audio signals as shown in FIG. 4 by step 403.

The following operation may be one of spatially analysing the (multichannel loudspeaker) signals in order to determine direction metadata as shown in FIG. 4 by step 405.

Then the energy ratios (for example the direct, diffuse and remainder energy ratios) are determined as shown in FIG. 4 by step 407.

In some embodiments the metadata and transport audio signals are processed (compressed/encoded). For example the number of the directions and ratios are furthermore controlled (and may be selected and/or combined). The processing of the metadata/transport audio signals is shown in FIG. 4 by step 409.

The processed transport audio signals and the metadata may then be furthermore be combined to generate a suitable data stream as shown in FIG. 4 by step 411.

Figure 5:
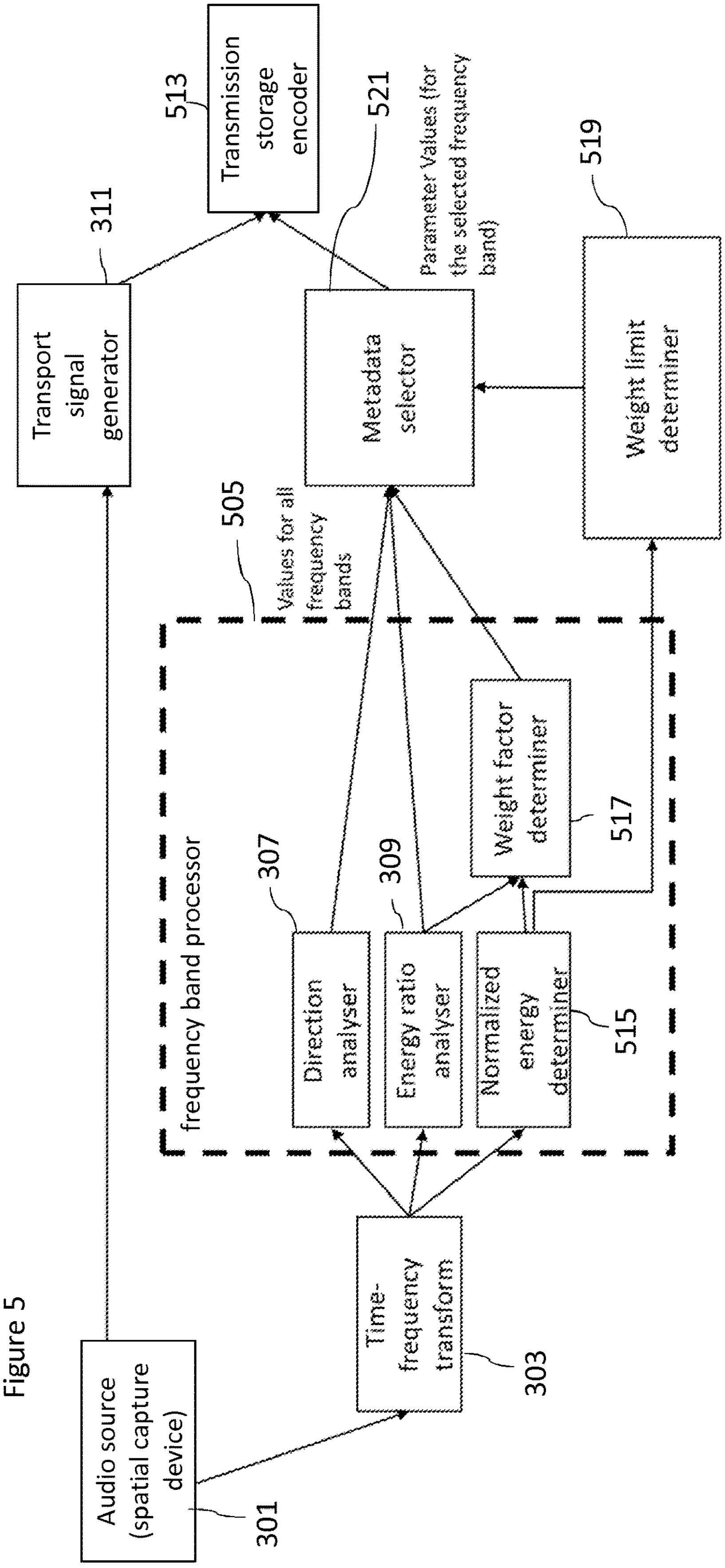
FIG. 5 shows schematically capture/encoding apparatus according to some embodiments.

With respect to FIG. 5 there is shown an example analysis processor 101 suitable for implementing some embodiments with additions over the example provided in FIG. 3.

The example analysis processor 101 is shown again with the input audio signal provided from an audio source 301 which also in this example is a spatial capture device configured to generate multichannel audio signals from multiple microphones. For example capturing a spatial audio signal can be performed with any known capture device. For example an Eigenmike or Nokia 8 mobile phone are suitable. As described previously the multichannel (spatial) audio signal may be any format such as mixed content (e.g., a multichannel audio format such as 5.1) and Ambisonics content that may produce the relevant spatial audio parameters.

The multichannel audio signals in this example are passed to a transport (audio) signal generator 311.

The transport signal generator 311 similar to the example in FIG. 3 is configured to generate the transport audio signals according to any of the options described previously. For example the transport signals may be downmixed from the input signals. The number of the transport audio signals may be any number and may be 2 or more or fewer than 2.

In the example shown in FIG. 5 the multichannel audio signals are also input to a time frequency transform 303. The time frequency transform 303 may be configured to generate suitable time-frequency representations of the multichannel audio signals and pass these to a frequency band processor 505.

The frequency band processor 505 is configured to generate spatial metadata outputs such as shown as the directions, direct-to-total energy ratios, and in some embodiments other types of energy ratios such as diffuse-to-total energy ratio(s) and remainder-to-total energy ratio(s).

The implementation of the analysis may be any suitable implementation that produces the described metadata outputs.

Thus for example in some embodiments the frequency band processor 505 comprises a direction analyser 307 configured to generate the direction metadata and an energy ratio analyser 309 configured to generate the energy ratio metadata.

These may be determined by performing spatial analysis on the time-frequency transformed multichannel audio signal.

An example of spatial analysis may be for example DirAC (Directional Audio Coding) spatial analysis.

DirAC may estimate the directions and diffuseness ratios (equivalent information to a direct-to-total ratio parameter) from a first-order Ambisonic (FOA) signal, or its variant the B-format signal.

$$FOA_i(t) = \begin{bmatrix} w_i(T) \\ x_i(r) \\ y_i(r) \\ z_i(T) \end{bmatrix}$$

The signals of $\Sigma_{i=1}^{NUM\_CH}$ $FOA_i(t)$ are transformed into frequency bands for example by STFT, resulting in time-frequency signals w(k,n), x(k,n), y(k,n), z(k,n) where k is the frequency bin index and n is the time index. DirAC estimates the intensity vector by $$I(k, n) = -Re\left\{w(k, n)^* \begin{Bmatrix} x(k, n) \\ y(k, n) \\ z(k, n) \end{Bmatrix}\right\},$$

where Re means real part, and asterisk * means complex conjugate.

The direction parameter is opposite of the direction of the real part of the intensity vector. The intensity vector may be averaged over several time and/or frequency indices prior to the determination of the direction parameter.

DirAC determines the diffuseness as $$\psi(k, n) = 1 - \frac{|E[I(k, n)]|}{E[0.5(w^2(k, n) + x^2(k, n) + y^2(k, n) + z^2(k, n))]}$$

Diffuseness is a ratio value that is 1 when the sound is fully ambient, and 0 when the sound is fully directional. Again, all parameters in the equation are typically averaged over time and/or frequency. The expectation operator E[ ] can be replaced with an average operator in practical systems.

When averaged, the diffuseness (and direction) parameters typically are determined in frequency bands combining several frequency bins k, for example, approximating the Bark frequency resolution.

DirAC, as determined above, is only one of the options to determine the directional and ratio metadata, and clearly one may utilize other methods to determine the metadata, for example, using a spatial audio capture (SPAC) algorithm with microphone-array signals (real or simulated). Furthermore, there are also many variants of DirAC analysis in the literature. For example where the input content is not FOA, a suitable modification can be done to convert the signal into FOA-format to perform analysis. Other analysis methods are also applicable as long as they produce the directional and energy ratio metadata.

The direction and energy ratio metadata for all of the analysed frequency bands may then be passed to a metadata selector 521.

Furthermore the output of the energy ratio analyser 309 is output to a weight factor determiner 517.

Furthermore the frequency band processor 505 comprises a normalised energy determiner 515 configured to generate a normalised energy determination and pass this to a weight factor determiner 517 and to a weight limit determiner 519.

In some embodiments the normalised energy determination may be performed as a two step operation. A first step being to calculate the average energy for each frequency band in this time instant for example with the following equation:

$$E_{avg} = \frac{1}{NKI}\sum_{n=1}^{N}\sum_{k=K_b}^{K_t}\sum_{i=1}^{I}|S(i, k, n)|^2$$

where N is number of time samples in this time frame, $K_b$ and $K_t$ are the current frequency band bottom and top frequency bins, and I is the number of input channels in the signal. S(i,k,n) is the time-frequency domain representation of the transport signal.

The second step may be to normalize the average energies of each frequency band so that the largest energy of any frequency band is found and then divide all energies with the largest energy value. This may be seen as the largest energy of a frequency band is (always) 1 and other frequency bands have less energy or represented as an equation as:

$$E_{norm}(i) = \frac{E_{avg}(i)}{\max(E_{avg})}$$

In some embodiments any suitable alternative normalization methods may be employed (e.g., normalizing with total energy instead of largest energy) and can be used but the limit parameter (as discussed hereafter) is appropriately tuned. In addition, in some embodiments unnormalized energy may be employed but the limit parameter requires even more careful tuning.

The frequency band processor 505 in some embodiments further comprises a weight factor determiner 517 configured to receive the normalised energy and the energy ratios and determine at least one weighting factor which is output to the metadata selector 521.

With the normalized energy known, the weight factor may be determined by based on the product of energy ratio and the normalized energy in the frequency band. The weight factor may therefore be determined by the equation:

$$w = rE_{norm}$$

where r is the energy ratio parameter.

This weight factor is a number between 0 and 1. It will be a very high value when there is a directional impulsive onset present in the scene as both energy ratio and normalized energy will be high. Likewise, if there is no onset present, these values tend to be lower for higher frequencies. The use of the product ensures that, for example, high normalized energy but low energy ratio (i.e., loud reverberation) does not produce high weight values as the direction and the metadata in this case is not the best representative.

In some embodiments, this weight factor can be any other suitable weight factor such as only the energy ratio parameter r.

The analysis processor 101 in some embodiments comprises a weight limit determiner 519 configured to receive the normalised energy determination and output a weight limit value to the metadata selector 521.

The weight limit can be a constant value (e.g., 0.5) or it can be based on the average normalized energy of all frequency bands in the time frame (e.g., average normalized energy multiplied with a constant like 0.5). The latter option is preferred and is formed as:

$$w_{thr} = \frac{c}{B}\sum_{i=1}^{B} E_{norm}(i)$$

where c is tuned threshold constant such as 0.5 and B is the total number of frequency bands.

In some embodiments, this weight limit can be any other suitable value.

The analysis processor 101 in some embodiments comprises a metadata selector 521 configured to receive the output of the direction analyser 307 (direction metadata for each band), energy ratio analyser 309 (energy ratio metadata for each band), weight factor determiner 517 (weight factors) and weight limit determiner 519. The metadata selector 521 is then configured to select one of the directions and energy ratios based on the weight factor and weight factor limit and pass the selected metadata to a transmission/storage encoder 513.

The metadata selector may be configured to choose or select the highest frequency band that has a weight factor over the weight limit. If for some reason no band has weight over the limit, the metadata selector in some embodiments is configured to select the lowest frequency band.

In some embodiments once the metadata selector determines the selected frequency band, it may be configured to discard metadata associated with the other bands.

In some embodiments the metadata selector is configured to prioritize and only discard part of the metadata. For example, in some embodiments the direction information for the other bands are discarded but the energy ratio parameters are kept for all frequency bands.

In some embodiments, two or more frequency bands (but fewer than the total number of frequency bands) are selected to represent the other frequency bands. For example, two frequency bands can be selected such that two (or N where N is less than the total number of frequency bands) highest frequency bands with weights over the threshold (or weight limit) are selected. The parameters associated with the selected higher frequency band is then used to represent parameters for frequency bands above it, and parameters associated with the lower frequency band is used to represent parameters for frequency bands below it, and both are used to represent frequency bands between them.

In some embodiments the 'best' frequency band is selected but a difference coding technique is employed to represent the other frequency bands.

For example for each frequency band:

- Direction may be coded separately for azimuth and elevation
  - Azimuth has 2 bits and represents offsets of 0°, 90°, 180°, or 270° from the chosen band azimuth
  - Elevation has 2 bits and represents offsets of 0°, 45°, and −45° (one value not used)
- Each ratio parameter has 2 bits and represents offsets of 0, 0.25, −0.25, −0.5

In some embodiments, a few bits are used to signal which frequency band is the reference band for the difference coding. Using this method still significantly reduces the bitrate but offers more accurate representation.

In some embodiments the highest frequency band is selected and the metadata associated with the highest frequency band is used to 'represent' all frequency bands. This is less optimal in quality but is computationally more efficient to implement.

The analysis processor 101 may further comprise a transmission/storage encoder 513. The transmission/storage encoder 513 may be configured to combine and encode the transport signals, the selected direction, and the energy ratio to generate the data stream 102.

For example in some embodiments the transmission/storage encoder 513 may comprise a suitable transport signal compressor/encoder configured to compress the audio signals using a suitable codec (e.g., AAC or EVS) and encoding metadata using entropy coding methods (e.g., codebook coding).

Figure 6:
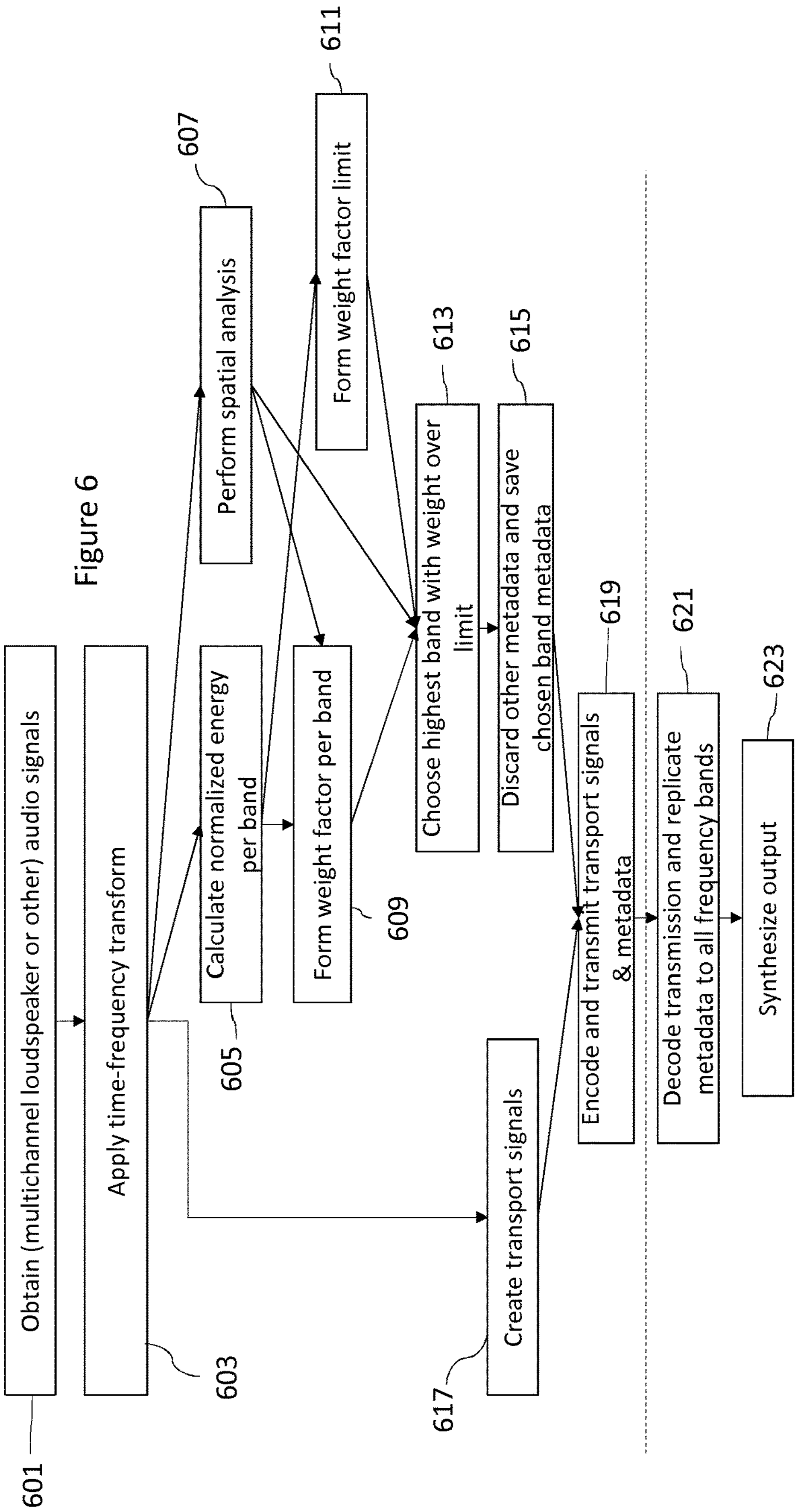
FIG. 6 shows a flow diagram of the operation of capture/encoding apparatus as shown in FIG. 5 according to some embodiments.

With respect to FIG. 6 is shown a flow diagram of the operation of the analysis processor shown in FIG. 5 (and additionally the synthesis processor shown in FIG. 1).

The first operation is one of obtaining the (multichannel loudspeaker or other) audio signals as shown in FIG. 6 by step 601.

The audio signals may be processed by the application of a time-frequency transform as shown in FIG. 6 by step 603.

In some embodiments the time-frequency domain audio signals are processed in some form to generate the transport signals as shown in FIG. 6 by step 617.

Furthermore in some embodiments the time-frequency domain audio signals are processed and spatial analysis performed to determine parameters such as direction(s) (and/or distance) and energy ratio(s) for each band as shown in FIG. 6 by step 607.

Additionally in some embodiments the time-frequency domain audio signals are processed and a normalised energy per band calculated as shown in FIG. 6 by step 605.

Having determined the normalised energy per band and spatial analysis then in some embodiments the weight factor per band is formed or determined as shown in FIG. 6 by step 609.

Also having determined the normalised energy per band in some embodiments the weight factor limit is formed or determined as shown in FIG. 6 by step 611.

Based on the weight factor per band and the weight factor limit a highest band with a weight over the limit is chosen as shown in FIG. 6 by step 613.

The other metadata is then discarded and the chosen band metadata saved as shown in FIG. 6 by step 615.

The selected metadata and transport signals are then compressed/encoded (and combined) before being stored and/or transmitted as shown in FIG. 6 by step 619.

With respect to the synthesis processor operations the transmitted/retrieved signal is decoded and metadata replicated for all frequency bands as shown in FIG. 6 by step 621.

Then a suitable spatial synthesis is performed as shown in FIG. 6 by step 623.

Figure 7:
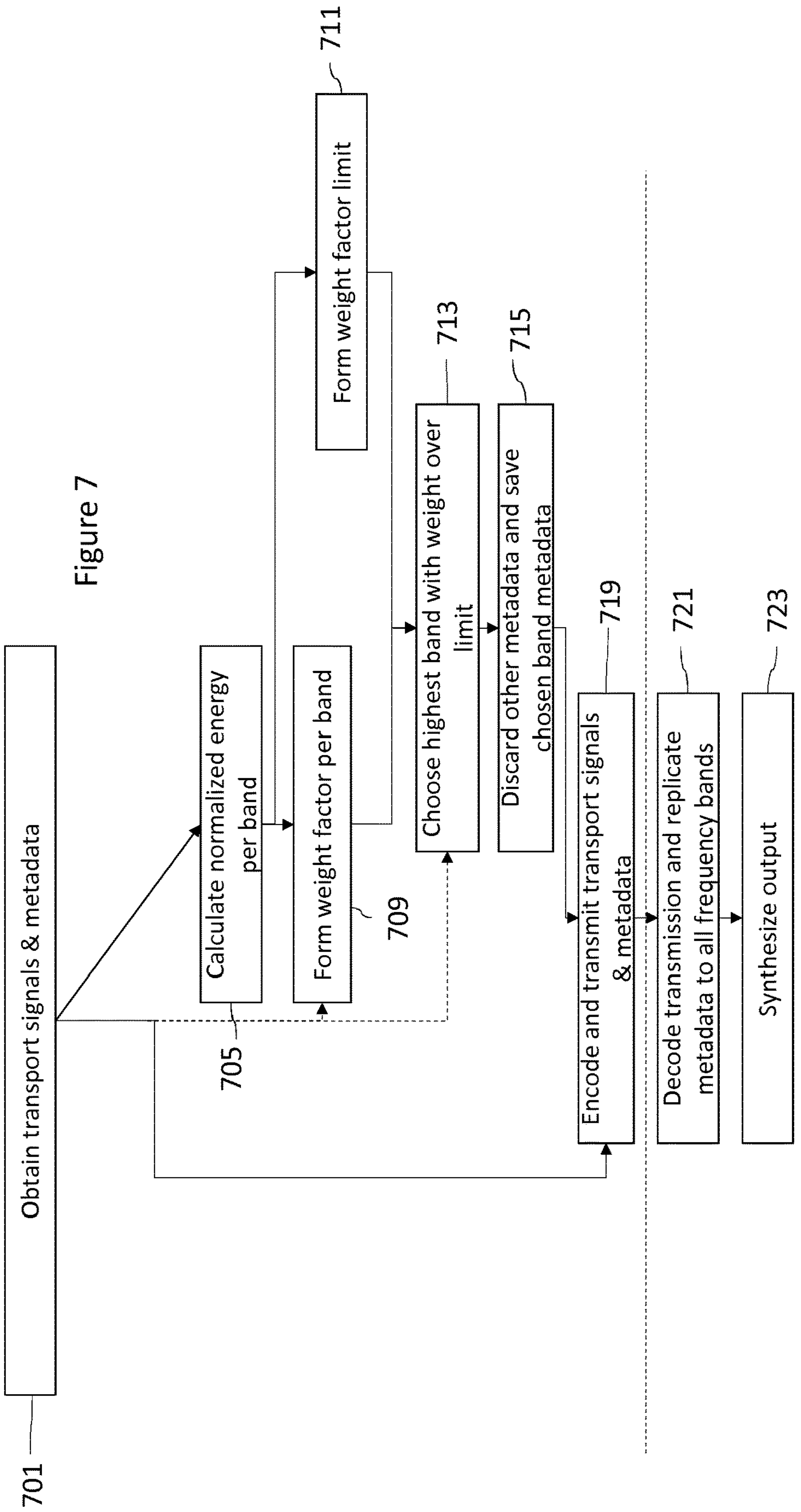
FIG. 7 shows a flow diagram of the operation of encoding apparatus encoding obtained transport signals and metadata according to some embodiments.

As described previously the audio signal input format may be any suitable format. For example with respect to FIG. 7 is shown a flow diagram of the operation of an encoder suitable to encoding an obtained transport audio signal and metadata. In such an embodiment the frequency band processor may comprise only the normalised energy determiner and weight factor determiner as the direction and energy ratios have been determined.

The first operation is one of obtaining the transport audio signals and metadata as shown in FIG. 7 by step 701.

In this example the parameters such as direction(s) (and/or distance) and energy ratio(s) for each band have been obtained and a normalised energy per band calculated as shown in FIG. 7 by step 705.

Having determined the normalised energy per band and spatial analysis then in some embodiments the weight factor per band is formed or determined as shown in FIG. 7 by step 709.

Also having determined the normalised energy per band in some embodiments the weight factor limit is formed or determined as shown in FIG. 7 by step 711.

Based on the weight factor per band and the weight factor limit a highest band with a weight over the limit is chosen as shown in FIG. 7 by step 713.

The other metadata is then discarded and the chosen band metadata saved as shown in FIG. 7 by step 715.

The selected metadata and transport signals are then compressed/encoded (and combined) before being stored and/or transmitted as shown in FIG. 7 by step 719.

With respect to the synthesis processor operations the transmitted/retrieved signal is decoded and metadata replicated for all frequency bands as shown in FIG. 7 by step 721.

Then a suitable spatial synthesis is performed as shown in FIG. 7 by step 723.

Figure 8:
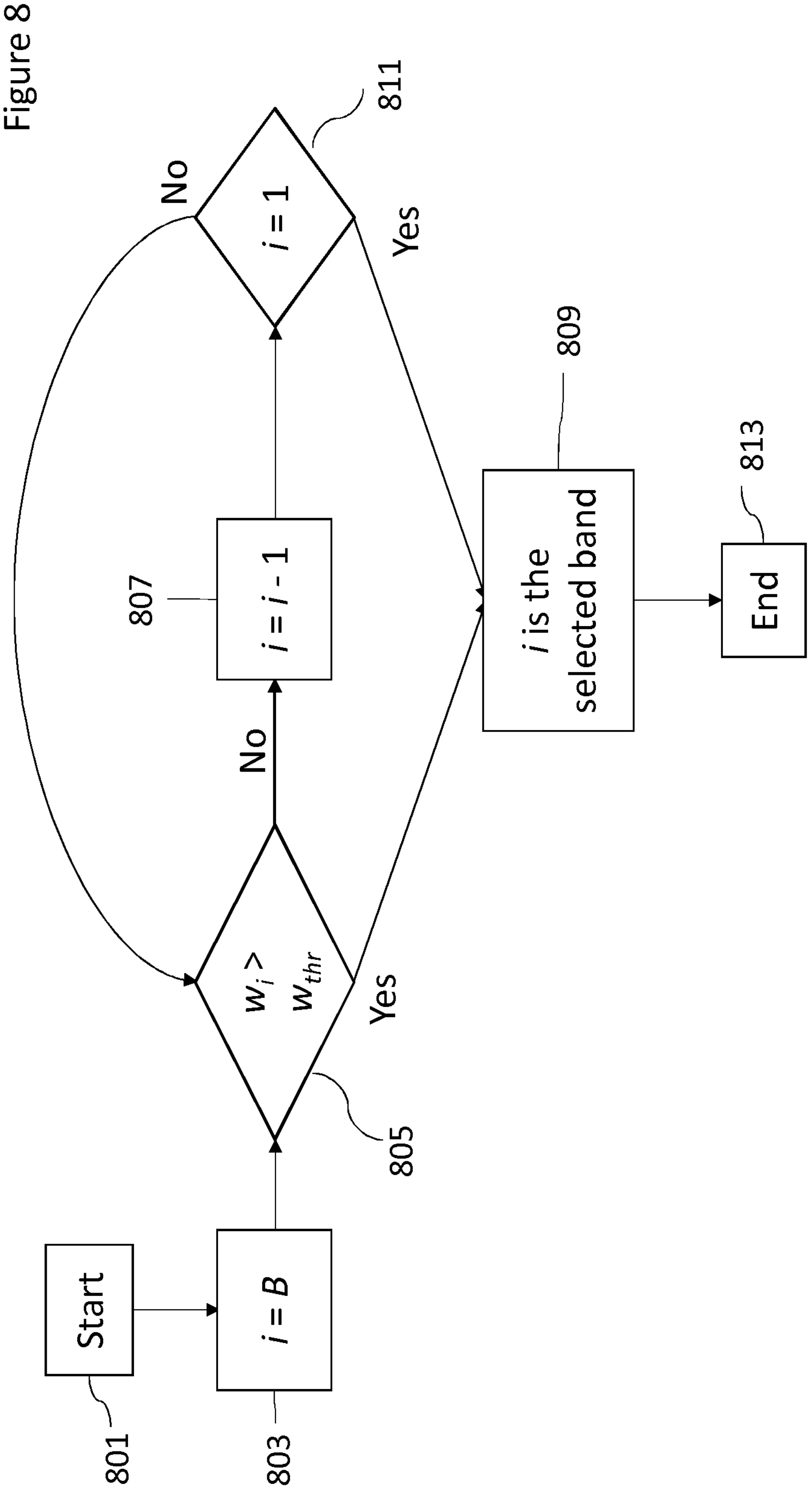
FIG. 8 shows a flow diagram of the band selection operation of capture/encoding apparatus as shown in FIG. 5 according to some embodiments.

With respect to FIG. 8 an example operation of the metadata selector is shown in further detail. The first operation is to start and receive the inputs such as weight factors, weight limits, and parameters as shown in FIG. 8 by step 801.

The next operation is setting an index i=B as shown in FIG. 8 by step 803.

The next operation is testing the index weight factor $w_i$ against the weight limit $w_{thr}$ as shown in FIG. 8 by step 803.

If $w_i > w_{thr}$ then the next operation is determining i is the selected frequency band as shown in FIG. 8 by step 809 and then ending the operation as shown in FIG. 8 by step 813.

If $w_i$ is not $>w_{thr}$ then the next operation is decrementing i by 1 as shown in FIG. 8 by step 807.

Having decremented i by 1 then the next operation is checking whether i=1 as shown in FIG. 8 by step 811.

Where i=1 then the next operation is determining i is the selected frequency band as shown in FIG. 8 by step 809 and then ending the operation as shown in FIG. 8 by step 813.

Where i is not=1 then the operation may then test the new index, index weight factor $w_i$ against the weight limit $w_{thr}$ as shown in FIG. 8 by step 803 and the process may continue until $w_i > w_{thr}$ for the index or the index=1.

The above assumes that frequency band indexing starts from 1. The above can be modified to accommodate any other indexing system (such as starting from 0).

With respect to the synthesis processor the single band metadata values may be obtained and then replicated for all frequency bands. This results in a normal full set of metadata that can be used in further synthesis.

The synthesis operation may then use the transport signals and replicated metadata to generate a suitable rendering of the audio signals. This procedure can be performed using any suitable means, for example, with methods such as DirAC based spatial audio signal synthesis. An example procedure for synthesising audio signals for loudspeakers is that the directions are synthesized into specific directions using 3D panning techniques such as vector-base amplitude panning (VBAP) multiplied with $\sqrt{r}$, and non-directional ambient signal is decorrelated with a phase-scrambling filter and reproduced to all directions multiplied with $$\sqrt{\frac{r}{c}},$$

where r is the energy ratio parameter and C is the number of loudspeaker channels.

In such a manner some embodiments may be implemented which reduce bitrate usage while offering quality that is in many cases at least reasonable and can be almost transparent (and in many cases is) to full metadata transmission with many signals. Bitrate reduction with the primary method is by factor of B, where B is the original number of frequency bands. I.e., if original metadata bitrate is 5 kb/s and B=5 then this method achieves bitrate of 1 kb/s.

Furthermore such embodiments may be able to produce a signal which is at least as good or better than using single wideband parametric analysis.

Additionally in some embodiments the implementation is computationally efficient method to reduce bitrate as it only requires a determination of the energies (this is often part of the analysis already) and weight factors and then discard data.

In some embodiments spatial sound transmission storage can be achieved even at very low bitrates.

For example a teleconference system may use a parametric spatial audio, e.g., DirAC, as the main analysis and synthesis method. Spatial capture may be obtained with an Eigenmike that produces first-order Ambisonics for this use. The spatial audio is analysed in time-frequency (20 ms frame and 30 frequency bands) domain and produces direction parameters as azimuth and elevation, and energy ratio parameter in form of diffuseness. Rather than encoding these parameters using a determined number of bits per parameter, i.e., 8 bits, to produce metadata at a bitrate of 36 kb/s (before other compression) the application of some embodiments may result in a bitrate of just 1.2 kb/s for the metadata (before other compression). This leaves more bits to use for the coding of the audio signal which directly results in better perceived audio quality.

A further example would be using time-frequency resolution such as 10 ms time frame and 12 frequency bands would result in following comparison bitrates. 24 kb/s compared to 2.4 kb/s according to some embodiments.

As the reduction in bitrate of metadata is quite large, it especially benefits the use case where the bitrate budget is very low. For example, 24 kb/s is usually in the domain of mono downmix or very compressed stereo if only raw audio encoding is used. If spatial metadata is introduced using, for example, the second time-frequency resolution above, the full spatial metadata would be hard to fit to the bitrate budget even after expected 50% entropy coding for it (metadata would take 12 kb/s of 24 kb/s available). However, using the presented embodiments it may be possible to reduce the metadata down to a fifth and in this case we achieve very reasonable division of bitrate after entropy coding (1.2 kb/s for metadata, 22.8 kb/s for audio) thus offering full spatial audio even at low bitrates instead of mono or stereo. This means that at low bitrates, it may be possible to achieve a significant sound quality increase compared to sending full metadata.

Figure 9:
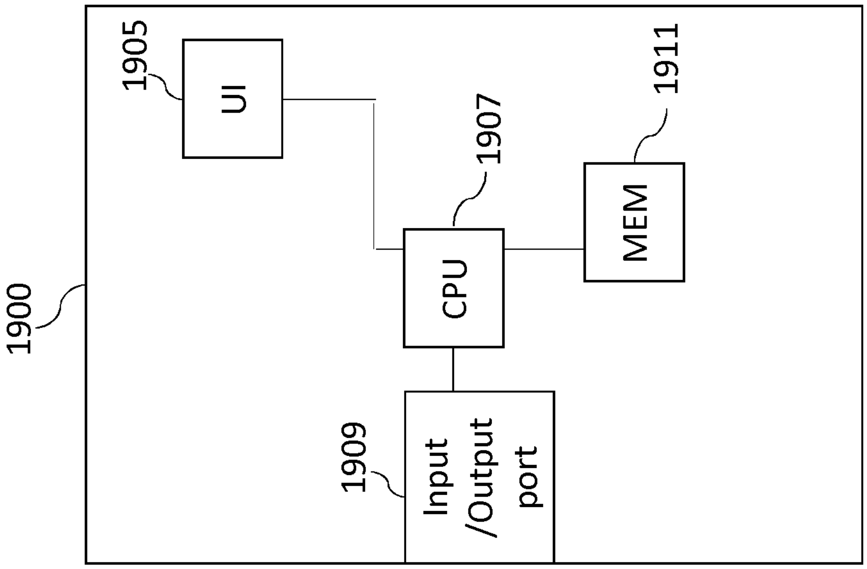
FIG. 9 shows schematically shows schematically an example device suitable for implementing the apparatus shown.

With respect to FIG. 9 an example electronic device which may be used as the analysis or synthesis device is shown. The device may be any suitable electronics device or apparatus. For example in some embodiments the device 1900 is a mobile device, user equipment, tablet computer, computer, audio playback apparatus, etc.

In some embodiments the device 1900 comprises at least one processor or central processing unit 1907. The processor 1907 can be configured to execute various program codes such as the methods such as described herein.

In some embodiments the device 1900 comprises a memory 1911. In some embodiments the at least one processor 1907 is coupled to the memory 1911. The memory 1911 can be any suitable storage means. In some embodiments the memory 1911 comprises a program code section for storing program codes implementable upon the processor 1907. Furthermore in some embodiments the memory 1911 can further comprise a stored data section for storing data, for example data that has been processed or to be processed in accordance with the embodiments as described herein. The implemented program code stored within the program code section and the data stored within the stored data section can be retrieved by the processor 1907 whenever needed via the memory-processor coupling.

In some embodiments the device 1900 comprises a user interface 1905. The user interface 1905 can be coupled in some embodiments to the processor 1907. In some embodiments the processor 1907 can control the operation of the user interface 1905 and receive inputs from the user interface 1905. In some embodiments the user interface 1905 can enable a user to input commands to the device 1900, for example via a keypad. In some embodiments the user interface 1905 can enable the user to obtain information from the device 1900. For example the user interface 1905 may comprise a display configured to display information from the device 1900 to the user. The user interface 1905 can in some embodiments comprise a touch screen or touch interface capable of both enabling information to be entered to the device 1900 and further displaying information to the user of the device 1900.

In some embodiments the device 1900 comprises an input/output port 1909. The input/output port 1909 in some embodiments comprises a transceiver. The transceiver in such embodiments can be coupled to the processor 1907 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1909 may be configured to receive the loudspeaker signals (or other input format audio signals) and in some embodiments determine the parameters as described herein by using the processor 1907 executing suitable code. Furthermore the device may generate a suitable transport signal and parameter output to be transmitted to the synthesis device.

In some embodiments the device 1900 may be employed as at least part of the synthesis device. As such the input/output port 1909 may be configured to receive the transport signals and in some embodiments the parameters determined at the capture device or processing device as described herein, and generate a suitable audio signal format output by using the processor 1907 executing suitable code. The input/output port 1909 may be coupled to any suitable audio output for example to a multichannel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus of an encoder comprising at least one processor and at least one memory including a computer program code, the at least one memory and the computer program code configured to, with the at least one processor, cause the apparatus at least to:

obtain, via the encoder, at least one audio signal;

generate, via the encoder, at least one transport signal based on the at least one audio signal;

obtain, via the encoder, metadata for each of at least two frequency bands associated with the at least one audio signal, wherein the metadata for a respective frequency band comprises at least one parameter;

select, via the encoder, a frequency band of the at least two frequency bands based on comparing at least one further respective parameter for each of the at least two frequency bands, wherein the at least one further respective parameter is determined from each of the at least two frequency bands, and wherein selecting the frequency band of the at least two frequency bands further comprises: (i) selecting the at least one parameter for the selected frequency band of the at least two frequency bands and (ii) discarding at least part of the metadata associated with an other of the at least two frequency bands;

generate, via the encoder, an output comprising a selection of the at least one parameter associated with the selected frequency band of the at least two frequency bands and not comprising the discarded other of the at least one parameter for the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands; and at least one of store or transmit the at least one transport signal and the output comprising the selection of the at least one parameter associated with the selected frequency band of the at least two frequency bands and not comprising the discarded other of the at least one parameter for the at least two frequency bands.

2. The apparatus as claimed in claim 1, wherein the at least one memory and the computer program code are configured to, with the at least one processor, cause the apparatus to obtain at least one parameter further by obtaining an energy ratio and energy respectively for each of the at least two frequency bands, and wherein the at least one memory and the computer program code are configured to, with the at least one processor, cause the apparatus to select the frequency band of the at least two frequency bands by:

determining an energy weight factor for each of the at least two frequency bands based on the energy ratio and energy for each of the at least two frequency bands, wherein the energy weight factor is the at least one further respective parameter for each of the at least two frequency bands;

determining a weight limit factor based on an averaged energy;

comparing the energy weight factor for each of the at least two frequency bands to the weight limit factor; and selecting a highest frequency band where the energy weight factor is greater than the weight limit factor.

3. The apparatus as claimed in claim 2, wherein the energy is a normalized energy.

4. The apparatus as claimed in claim 1, wherein the at least one memory and the computer program code are configured to, with the at least one processor, cause the apparatus to obtain at least one parameter by obtaining at least one of:
- a directional parameter;
- a distance parameter;
- an energy parameter; and
- an energy ratio parameter.

5. The apparatus as claimed in claim 1, wherein the at least one memory and the computer program code are configured to, with the at least one processor, cause the apparatus to select the frequency band by:
- saving the at least one parameter for one of the at least two frequency bands; and
- discarding another of the at least one parameter for the at least two frequency bands, wherein generating the output is further comprising generating an output comprising the saved at least one parameter for one of the at least two frequency bands and not the discarded other of the at least one parameter for the at least two frequency bands.

6. The apparatus as claimed in claim 1, wherein the at least one memory and the computer program code are configured to, with the at least one processor, cause the apparatus to select the frequency band by:
- saving the at least one parameter for one of the at least two frequency bands; and
- determining a difference between another of the at least one parameter for the at least two frequency bands and the at least one parameter for one of the at least two frequency bands,
- wherein the output generated comprises the difference.

7. The apparatus as claimed in claim 1, wherein the at least one memory and the computer program code are configured to, with the at least one processor, cause the apparatus to generate the output by generating a datastream for storing/transmission based on a combination of the at least one parameter and the at least one transport signal.

8. The apparatus as claimed in claim 7, wherein the at least one memory and the computer program code are configured to, with the at least one processor, cause the apparatus to generate a datastream for storing/transmission by:
- encoding the at least one transport signal;
- encoding the at least one parameter associated with the selected frequency band of the at least two frequency bands; and
- combining the encoded transport signal and the encoded at least one parameter associated with the selected frequency band of the at least two frequency bands.

9. The apparatus as claimed in claim 7, wherein the at least one memory and the computer program code are configured to, with the at least one processor, cause the apparatus to generate the at least one transport signal by at least one of:
- downmixing the at least one audio signal;
- selecting at least one audio signal from the at least one audio signal, when the at least one audio signal comprises two or more audio signals;
- generating directional signals directed to different directions, when the at least one audio signal comprises first order ambisonic audio signals;
- generating cardioid signals directed to different directions, when the at least one audio signal comprises first order ambisonic audio signals;
- generating cardioid signals directed at opposite directions, when the at least one audio signal comprises first order ambisonic audio signals; and
- passing at least one transport audio signal, when the at least one audio signal comprises at least one transport audio signal.

10. The apparatus as claimed in claim 1, wherein the at least one memory and the computer program code are configured to, with the at least one processor, cause the apparatus to obtain at least one signal by obtaining at least one of:
- a directional parameter;
- a distance parameter;
- an energy parameter; and
- an energy ratio parameter.

11. The apparatus as claimed in claim 1, wherein the at least one memory and the computer program code are configured to, with the at least one processor, cause the apparatus to replicate by copying the at least one parameter for one of the at least two frequency bands as the at least one other of the at least two frequency bands.

12. The apparatus as claimed in claim 1, wherein the at least one audio signal further comprises at least one parameter associated with a difference between at least one other of the at least two frequency bands and the at least one parameter for one of the at least two frequency bands, wherein
- the at least one memory and the computer program code are configured to, with the at least one processor, cause the apparatus to replicate the at least one parameter for at least one other of the at least two frequency bands based on a combination of the at least one parameter for one of the at least two frequency bands and the at least one parameter associated with the difference between at least one other of the at least two frequency bands and the at least one parameter for one of the at least two frequency bands.

13. The apparatus as claimed in claim 1, wherein at least part of the metadata comprises one or more direction parameters or one or more energy ratio parameters.

14. A method implemented by an encoder, the method comprising:
- obtaining, via the encoder, at least one audio signal;
- generate, via the encoder, at least one transport signal based on the at least one audio signal;
- obtaining, via the encoder, metadata for each of at least two frequency bands associated with the at least one audio signal, wherein the metadata for a respective frequency band comprises at least one parameter;
- selecting, via the encoder, a frequency band of the at least two frequency bands based on comparing at least one further respective parameter for each of the at least two frequency bands, wherein the at least one further respective parameter is determined from each of the at least two frequency bands, and wherein selecting the frequency band of the at least two frequency bands further comprises: (i) selecting the at least one parameter for the selected frequency band of the at least two frequency bands and (ii) discarding at least part of the metadata associated with an other of the at least two frequency bands;
- generating, via the encoder, an output comprising a selection of the at least one parameter associated with the selected frequency band of the at least two frequency bands and not comprising the discarded other of the at least one parameter for the at least two frequency bands, such that the selection of the at least one parameter associated with the selected frequency band is configured to reduce a bitrate or size of the output and wherein the at least one parameter of the selected frequency band is configured to represent respective parameters of the at least two frequency bands; and at least one of: storing, or transmitting the at least one transport signal and the output comprising the selection of the at least one parameter associated with the selected frequency band of the at least two frequency bands and not comprising the discarded other of the at least one parameter for the at least two frequency bands.

15. The method as claimed in claim 14, wherein generating the output comprises generating a datastream for storing/transmission based on a combination of the at least one parameter and the at least one transport signal.

16. The method as claimed in claim 15, wherein generating the datastream for storing/transmission comprises at least one of:

encoding the at least one transport signal;

encoding the at least one parameter associated with the selected frequency band of the at least two frequency bands; and combining the encoded transport signal and the encoded at least one parameter associated with the selected frequency band of the at least two frequency bands.

17. The method as claimed in claim 15, wherein generating the at least one transport signal further comprises at least one of:

downmixing the at least one audio signal;

selecting at least one audio signal from the at least one audio signal, when the at least one audio signal comprises two or more audio signals;

generating directional signals directed to different directions, when the at least one audio signal comprises first order ambisonic audio signals;

generating cardioid signals directed to different directions, when the at least one audio signal comprises first order ambisonic audio signals;

generating cardioid signals directed at opposite directions, when the at least one audio signal comprises first order ambisonic audio signals; and passing at least one transport audio signal, when the at least one audio signal comprises at least one transport audio signal.

18. A non-transitory computer readable medium of an encoder, the computer readable medium comprising program instructions for causing an apparatus to perform at least the following:

obtain at least one audio signal;

generate at least one transport signal based on the at least one audio signal;

obtain metadata for each of at least two frequency bands associated with the at least one audio signal, wherein the metadata for a respective frequency band comprises at least one parameter;

select a frequency band of the at least two frequency bands based on comparing at least one further respective parameter for each of the at least two frequency bands, wherein the at least one further respective parameter is determined from each of the at least two frequency bands, wherein selecting the frequency band of the at least two frequency bands further comprises: (i) selecting the at least one parameter for the selected frequency band of the at least two frequency bands and (ii) discarding at least part of the metadata associated with an other of the at least two frequency bands;

generate an output comprising a selection of the at least one parameter associated with the selected frequency band of the at least two frequency bands and not comprising the discarded other of the at least one parameter for the at least two frequency bands such that the selection of the at least one parameter associated with the selected frequency band is configured to reduce a bitrate or size of the output and wherein the at least one parameter of the selected frequency band is configured to represent respective parameters of the at least two frequency bands; and at least one of: store, or transmit the at least one transport signal and the output comprising the selection of the at least one parameter associated with the selected frequency band of the at least two frequency bands and not comprising the discarded other of the at least one parameter for the at least two frequency bands.

19. The apparatus as claimed in claim 1, wherein the at least one memory and the computer program code are configured to, with the at least one processor, cause the apparatus to obtain at least one parameter further by obtaining an energy ratio and energy respectively for each of the at least two frequency bands, and wherein the at least one memory and the computer program code are configured to, with the at least one processor, cause the apparatus to select the frequency band of the at least two frequency bands by:

determining an energy weight factor for each of the at least two frequency bands based on the energy ratio and energy for each of the at least two frequency bands, wherein the energy weight factor is the at least one further respective parameter for each of the at least two frequency bands;

determining a weight limit factor based on an averaged energy;

comparing the energy weight factor for each of the at least two frequency bands to the weight limit factor; and selecting a highest frequency band where the energy weight factor is greater than the weight limit factor.

20. The apparatus as claimed in claim 1, wherein the at least one memory and the computer program code are configured to, with the at least one processor, cause the apparatus to select a frequency band of the at least two frequency bands by selecting the highest frequency band of the at least two frequency bands.

* * * * *